Feb. 3, 1942.  W. H. SILVER  2,272,096
DAM FORMING DEVICE
Filed April 1, 1940  2 Sheets-Sheet 1

INVENTOR:
WALTER H. SILVER

ATTORNEYS.

Feb. 3, 1942.  W. H. SILVER  2,272,096
DAM FORMING DEVICE
Filed April 1, 1940   2 Sheets-Sheet 2
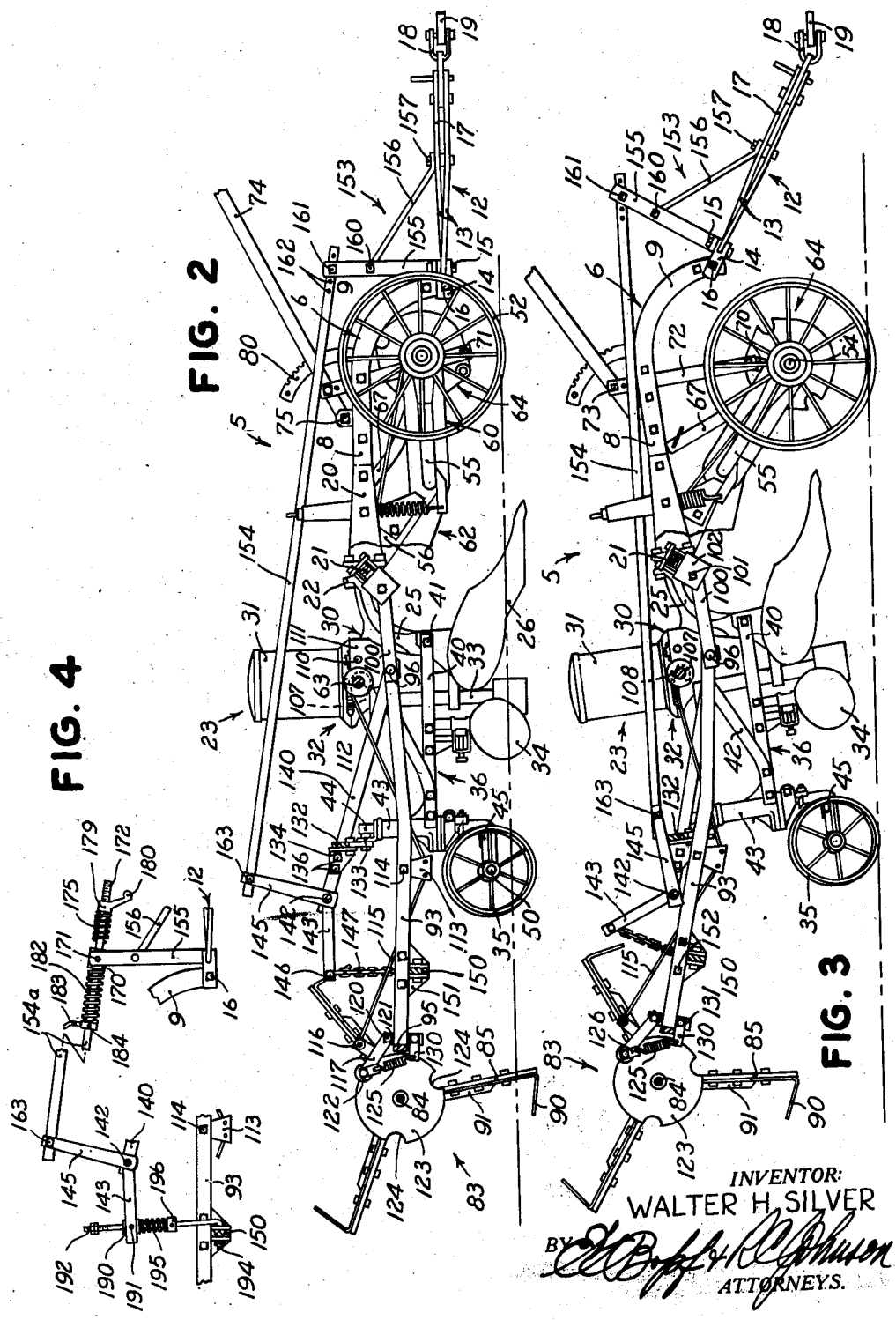
INVENTOR:
WALTER H. SILVER
BY
ATTORNEYS.

Patented Feb. 3, 1942

2,272,096

UNITED STATES PATENT OFFICE 2,272,096

DAM FORMING DEVICE

Walter H. Silver, Moline, Ill., assignor to Deere & Company, Moline, Ill., a corporation of Illinois Application April 1, 1940, Serial No. 327,218

14 Claims. (Cl. 97—55)

This application is a continuation-in-part of my co-pending application, Serial No. 178,745, filed December 8, 1937, now Patent No. 2,196,038, dated April 2, 1940.

The present invention relates to dam forming attachments for use with listers and other furrow forming implements or the like, and more particularly to implements for forming spaced apart dams associated with planting and like implements.

The principal object of the present invention is to provide a damming device for attachment to a lister. Another object of this invention is the provision of a damming device particularly adapted to operate behind the planting units of a lister or the like. Another feature of the present invention is the provision of a damming attachment having blades which are shaped to accommodate the furrow in which they operate. An additional feature of this invention is to provide a damming attachment having blades particularly constructed so as to operate behind the press wheels of the lister with which the damming attachment is associated.

A further feature of this invention is the provision of a damming attachment having blades which are arranged to operate at about the same level as the press wheels of the several planting units, and another object of this invention is the provision of a damming blade arranged with earth contacting portions which are particularly disposed so as to avoid disturbing the seed planted. Another feature of this invention resides in the provision of means for adjusting the damming device so as to correspond to the position of the furrow opening tools.

These and other objects and advantages of the present invention will become apparent after a consideration of the following detailed description of a preferred embodiment. Reference is had to the appended drawings, in which Figure 1 is a plan view of a two row lister and attached dam forming device embodying the principles of the present invention;

Figure 2 is a partial sectional view taken along the line 2—2 of Figure 1, showing the implements in ground-engaging position;

Figure 3 is a view similar to Figure 2 showing the implements raised in transport position; and Figure 4 is a fragmentary view, showing a modified forming of connecting means associated with the damming device.

Figure 1:
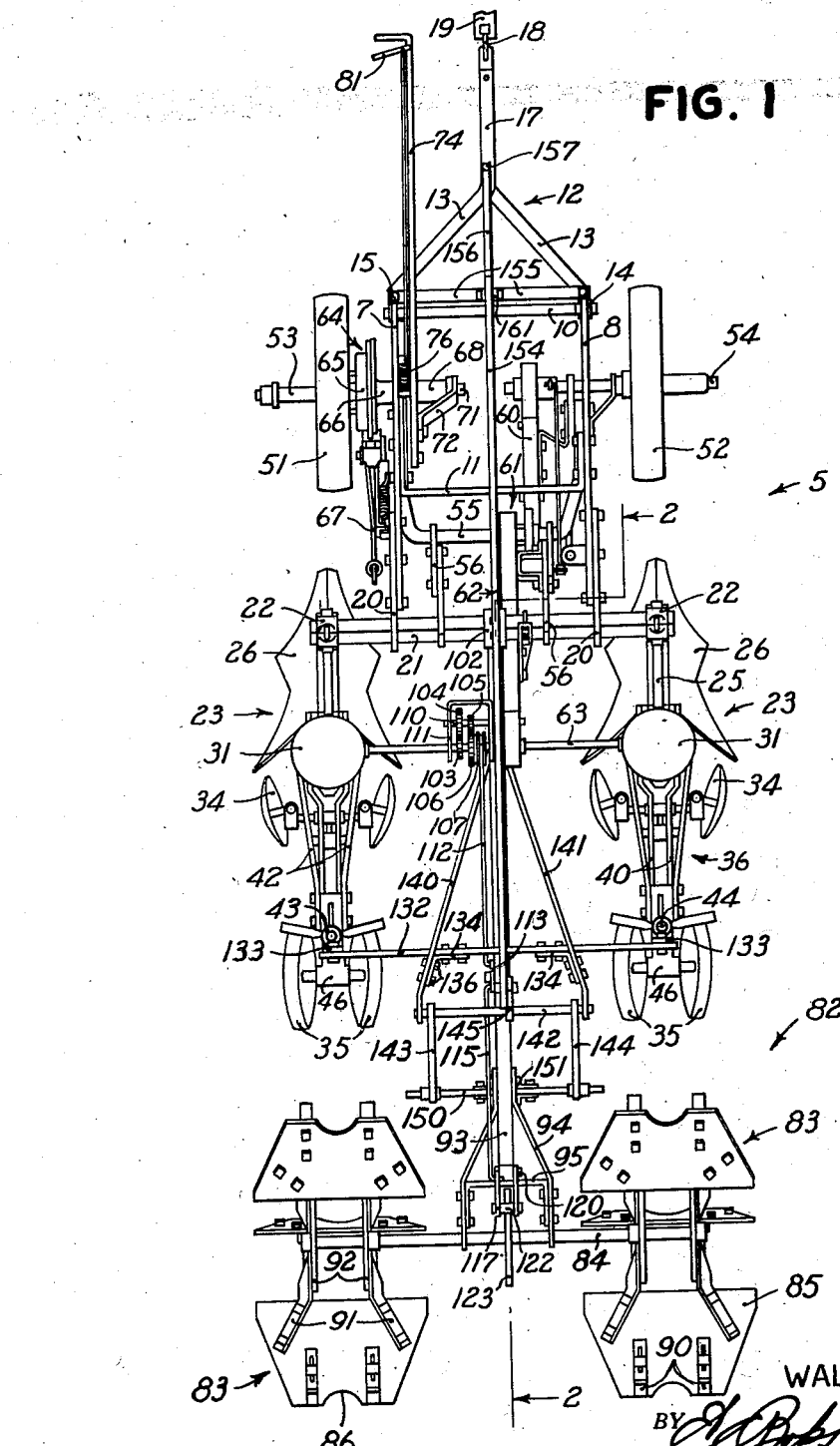
Figure 1:

Referring now to the drawings, the lister, indicated in its entirety by the reference numeral 5, comprises a frame 6 including a pair of spaced longitudinal beams 7, 8, the forward ends of which are bent downwardly, as at 9, and rigidly interconnected by means of a transverse member 10. A second transverse member 11, disposed to the rear of member 10, is likewise fixed at its ends to the beams 7, 8, providing for a rigid structure to which the various tools and supporting wheels may be attached.

In the preferred embodiment shown and described herein, the lister 5 is intended for use with a tractor (not shown) to which the frame 6 is connected by means of a supplemental or draft frame 12. The draft frame 12 consists of two bail members 13 having links 14 fixed to the rear ends thereof by bolts 15. The links 14 are pivotally connected by pivot bolts 16 to the ends of the beams 7, 8 for vertical swinging movement. The bail members 13 converge forwardly and are joined to form a single draft tongue 17. A clevis 18 at the forward end of the draft tongue 17 provides means for flexibly connecting the draft frame 12 to the drawbar 19 of the tractor.

Fixed to the rear end of each of the beams 7, 8 and extending rearwardly therefrom is a bracket member 20. A transverse tool bar 21 of uniform square cross section is supported in the ends of the two bracket members 20 and rigidly fixed thereto, as by welding. Clamped to the tool bar 21 by means of clamps 22 are two laterally spaced planters 23, each comprising a downwardly and rearwardly curved tool shank 25, at the lower end of which is carried a furrow opener 26. A bracket, indicated at 30, which is preferably formed integral with the tool shank 25, supports the planting mechanism comprising a seed container 31, seed selecting and dropping mechanism 32, and seed spout 33. The spout 33 drops the seed into the bottom of the furrow directly behind the furrow opener 26 where it is immediately covered with soil by the covering shovels 34 and pressed down by presser wheel means, preferably in the form of a pair of trailing press wheels 35. The latter are of more or less conventional construction, each having rim or flange and both wheels of each unit being mounted at an angle so that the soil is compacted about the deposited seed, with the soil higher directly above the seed than at the side where the flanges or rims of the wheels run, in convex form, as is usual in planting implements. The two press wheels 35 shown as associated with each unit, compacts the soil in substantially the same manner and serve as a single wheel with rims or flanges spaced apart the same distance as the distance between the lower portions of the wheels 35, both forms of press wheels being old and well known.

The covering shovels 34 and press wheels 35 are carried on a frame 36 comprising a pair of spaced longitudinal members 40 which are bolted at 41 to the tool shank 25 and are braced by struts 42. The rear end of the frame 36 includes a vertical sleeve 43 in which is journaled a spindle 44. The lower portion of the spindle 44 is bent rearwardly, as at 45, terminating in an axle housing 46, and the axles 50, upon which the furrow wheels 35 are journaled, are carried in the housing 46.

The forward portion of the lister 5 is supported on a pair of laterally spaced ground wheels 51, 52 which are fixed on live axles 53, 54, respectively. The lister frame 6 is connected to the axles 53, 54 by means of a bail 55 which is journaled for vertical swinging movement in two bracket members 56; the latter being fixed, as by welding, to the tool bar 21 and extending forwardly therefrom. The live axles 53, 54 are journaled in the ends of the bail 55.

Power for driving the seed selecting and dropping mechanisms 32 of the planters 23 is derived from the right ground wheel 52 and is transmitted by a sprocket and chain drive, indicated by the reference numeral 60, from the live axle 54 to an intermediate sprocket element, indicated at 61, which is journaled on the transverse portion of the bail 55. A second sprocket and chain drive, indicated by the reference numeral 62, transmits the power back to a seeding mechanism drive shaft 63.

Lifting of the lister 5 is accomplished by means of a self-interrupting clutch mechanism 64 of conventional design well known in the art, and adjustable connecting linkage which will be described shortly. As the details of the clutch have no bearing on the present invention, it is deemed sufficient to state that in general it comprises a continuously rotating driving element 65 which is operatively connected with the live axle 53, a normally non-rotating driven member 66 which is journaled on the axle 53, and means for optionally engaging and automatically disengaging the driving element and driven member after a half revolution. Engagement of the two members is effected by pulling on a trip lever 67 which is pivotally connected to the adjacent arm of the bail 55 and operatively connected with the engaging mechanism disposed within the clutch 64. The driven clutch member 66 includes an inwardly directed sleeve portion 68 which embraces the axle 53, and the inner end of which is provided with a crank arm 70. Connected at one end to the crank arm 70 by means of a pivot bolt 71 is a link 72, the other end of which is connected by a pivot bolt 73 to a hand lever 74. The hand lever 74 is swingably connected to the frame member 7 by means of a pivot bolt 75 and is held in position by a latch 76 which engages a notched sector 80. A grip lever 81 at the handle end of the hand lever 74 controls the latch 76. The hand lever 74 raises and lowers the front of the frame 6, and hence determines the operating depth of the blades or scrapers, of the damming attachment, inasmuch as it acts through parts described below to vary the position of rear lifting arms connected with the damming blades.

Coming now to that portion of the implement with which the present invention is more directly concerned, a dam forming device, indicated in its entirety by the reference numeral 82, comprising two scraper blade assemblies 83 fixed on opposite ends of a transverse shaft 84, is disposed to the rear of the lister 5 with each of the blade assemblies 83 aligned with its respective planter 23 to operate in the furrow formed thereby. Each blade assembly 83 consists of three blades or scrapers 85 arranged radially about the shaft 84 at 120 degrees spacing. The sides of the blades 85 are tapered to accommodate the sides of the furrow, while the center portion of the outer edge is relieved, as at 86, to clear the seed planted by the planter 23 and prevent its being disturbed, the remaining portions of the outer edge of each blade 85 being formed so as to lie, in operative position, on substantially the level of the press wheel means, as best shown in Figure 2. As best shown in Figure 1, the width of the scrapers or blades 85 at their outer edges is approximately the same as the distance between adjacent press wheels 35, both conforming generally to the furrows opened by the bottoms 26. Adjustable gauging runners 90 are fixed to the back sides of the blades 85 to hold the latter at a constant predetermined working depth. From Figure 2 it will be seen that the lower edge of the blade 85 in operating position is at substantially the level of the press wheels 35. Bracket members 91 connect the blades 85 to a pair of spaced plates 92 which are fixed to the shaft 84.

Connecting the dam forming device 82 to the lister 5 is a frame including a forwardly extending draft beam 93, at the rear portion of which are fixed two rearwardly diverging members 94 braced by a cross member 95. The shaft 84 is journaled in the ends of the members 94. The forward end of the draft beam 93 is pivotally connected by means of a transverse pivot bolt 96 to a link 100, providing for vertical swinging movement of the beam 93. The link 100 is secured by a bolt 101 to a bracket member 102 which is clamped to the tool bar 21.

In the operation of the dam forming device 82, the scraper blade assembly 83 is held against rotation and in operative position, illustrated in Figure 2, as it is drawn through the furrow opened up by the furrow opener 26. The operatively positioned blade 85 engages the sides of the furrow and scrapes soil from the sides thereof until sufficient has been accumulated to form a dam. At this point the blade assembly 83 is released and permitted to rotate, depositing the accumulation of soil across the furrow, while the succeeding blade 85 is swung downwardly and locked into operating position. Thus, each blade when in engagement with the bottom of the furrow serves to rotate the whole blade unit when the latter is released; in other words, each blade serves as ground engaging means for advancing the others. In the embodiment shown and described herein, the dams are spaced an equal distance apart by escapement mechanism actuated by the ground wheel 52 and thereby controlled by the forward movement of the implement over the ground. It has previously been explained that the seeding mechanism shaft 63 is operatively connected to the live axle 54 by means of sprocket and chain drives 60 and 62 and therefore rotates at a speed directly protportional to the speed of rotation of the ground wheel 52. The shaft 63 is employed to actuate the escapement mechanism for the scraper blade assemblies 83, therefore, and driving connection is made through a train of speed reduction gears 103, 104, 105, and 106 to rotate a cam 107 which is journaled on the shaft 63. Gear 103 is fixed on the shaft 63; both gears 104, 105 are fixed on a countershaft 110 which is journaled in a bracket 111; and the driven gear 106 is journaled on the shaft 63 and fixedly connected to the cam 107. The bracket 111 is journaled on the shaft 63 for support and also connected to the link 100 by means of the pivot bolt 96, the latter connection holding the bracket 111 against rotation about the shaft 63. A cam follower 109 attached to one end of a rearwardly extending rod 112, engages the cam 107 and with each revolution of the latter is drawn forwardly and then released to drop back to its original position. The rear end of the rod 112 is swingably connected to a link 113 which is pivotally connected at 114 to the draft beam 93. A second rod 115 is likewise swingably connected to the link 113 and extends rearwardly to a pivotal connection at 116 with a rearwardly inclined detent arm 117. The latter is swingably connected at 120 to a stub 121 which projects upwardly from the end of the draft beam 93. Thus, it will be seen that the reciprocating movement of the rod 112 as the attached cam follower is acted upon by the cam 107 is transmitted back to the detent arm 117 to swing the latter in a vertical plane.

A roller 122 journaled in the outer end of the detent arm 117 bears against the periphery of a circular disk 123 which is fixed on the shaft 84. The disk 123 is notched at three 120 degrees spaced points 124, and when the blade assembly 83 is in operative position, one of the notches 124 is engaged by the roller 122 thus holding the disk 123, shaft 84, and scraper blade assemblies 83 against rotation. When the detent arm 117 is swung upwardly under the influence of the cam 107, the roller 122 is disengaged from the notch 124 and the scraper blade assemblies 83 are permitted to rotate. A spring 125 connected at one end by means of a link 126 to the detent arm 117, and at the other end by a link 130 to a stub 131 extending downwardly from the end of the draft beam 93, holds the roller under tension against the disk 123.

It has previously been pointed out that the lister 5 is raised to inoperative or transport position by action of the self-interrupting clutch mechanism 64 on linkage connected to the frame 6, which causes the bail 55 to be swung downwardly and thereby raises the front end of the lister 5 sufficiently high for the planter tools to clear the ground. Swinging the hand lever 74 to effect a depth adjustment also raises and lowers the lister frame a certain amount by tilting the same about the press wheels 35. Obviously, this tilting of the frame longitudinally about the rear furrow wheels 35 will not, in itself, raise the dam forming device 82 which is disposed to the rear of the furrow wheels. Therefore, supplementary lifting linkage is required for lifting the dam forming device at the same time that the lister is raised, and to this end a transverse beam 132 has been provided, upon which is carried lifting mechanism now to be described. The beam 132 is bowed upwardly in the center portion thereof to provide clearance for the draft beam 93 as the latter is swung upwardly, and to the ends of the transverse beam 132 are bolted angle brackets 133 which are fixed to the tops of the vertical sleeves 43. A pair of brackets 134 is spaced symmetrically on either side of the center of the beam 132 and fixed thereto. Secured to the brackets 134 by bolts 136 and extending diagonally forwardly and downwardly therefrom, are two bracing members 140, 141 which converge on opposite sides of the link member 100 and are fixed thereto by the pivot bolt 96. A transverse rock shaft 142 is journaled in the ends of the bracing members 140, 141, which extend a short distance rearwardly of the brackets 134, and fixed to the rock shaft 142 adjacent the members 140, 141 are two rearwardly extending lifting arms 143, 144. Also fixed to the shaft 142 midway between the lifting arms 143, 144 is an upwardly extending crank arm 145, the purpose of which shall be explained later.

Fastened to the outer end of each of the lifting arms 143, 144 by a bolt 146 is a chain 147 which is connected at its lower end to a transverse bar 150. The latter is fixed to two brackets 151 which are bolted by bolts 152 to the draft beam 93. Thus, rocking the lifting arms 143, 144 raises or lowers the draft beam 93 and attached dam forming device 82.

In the preferred embodiment shown and described herein, when the implement is in operation, the blades or scrapers 85, normally locked against rotation, are drawn along the furrows behind the press wheels and the lister bottoms 26, the damming blades being normally held to their work by their own weight, and limited in their downward movement by the chains 147, as when the soil is light or soft. The blades serve to level the surface at the bottom of the furrow and loose soil collects in front of the blades until they are tripped by the latch mechanism 126, which then leaves dams across the furrow. The rock shaft 142 is rocked by linkage connecting the draft frame 12 with the crank arm 145. When the lister 5 is raised to inoperative or transport position (Figure 3) by actuating the clutch 64 and tilting the frame 6, the front ends of the beams 7, 8 are raised relative to the point of connection of the draft frame 12 to the tractor drawbar 19, causing the draft frame 12 to swing relatively downwardly about the pivot bolt 16. The resulting angulation between the lister frame 6 and draft frame 12 is translated into reciprocating motion by means of a crank structure, indicated in its entirety by the reference numeral 153, and is transmitted by a connecting rod 154 to the crank arm 145 to rock the rock shaft 142. The crank structure 153 comprises a pair of members 155 which are connected by the bolts 15 to the draft frame 12 adjacent the links 14, and extend upwardly in converging relation to join on opposite sides of a bracing strut 156. The three members are joined by a bolt 160 at this point and the two members 155 continue upwardly in parallel relation and spaced apart the thickness of the intervening bracing strut 156. The strut 156 extends downwardly and forwardly and is fixed at 157 to the draft tongue 17, providing for longitudinal rigidity of the crank structure 153. The connecting rod 154 is carried between the ends of the members 155 and is pivotally connected thereto by a pin bolt 161. Additional perforations 162 in the end of the connecting rod 154 provide means for adjusting the working depth of the dam forming device 82 by changing the angular position of the crank arm 145 relative to the crank structure 153. The connecting rod 154 is pivotally connected at its rear end to the crank arm 145 by means of a pivot bolt 163. While the principal function of this linkage is to raise the damming units 83 to their upper or transport position whenever the half-revolution clutch 64 is actuated to raise the lister bottoms 26 out of the ground and into their inoperative or transport position, it will nevertheless be noted that operating the depth adjusting lever 74 will also cause the hitch frame 12 to swing through a limited extent, and that this swinging movement also acts through the linkage 154 and associated parts to rock the lifting arms 143, 144, and hence adjust the operating position of the damming blades in so far as varying the position of the lifting arms 143 and 144 will change the lower limits to which the damming attachment is permitted to move by virtue of their chain connection 147 with the arms 143, 144.

By this linkage arrangement, the weight of the dam forming device 83 is made to bear downwardly upon the ground wheels 51, 52 when the implement is raised, increasing the traction and thereby improving the operation of the power lift clutch 64 which derives its power from the tractive force of wheel 51.

Under some operating conditions the weight alone of the dam forming device is not sufficient to insure that the damming blades will always operate in the bottom of the furrows, and to take care of such situations I have devised certain modified connections between the dam forming device and the front draft frame, the angular position of which relative to the lister frame controls the position of the dam forming device. Such modified connections will now be described.

Referring to Figure 4, it will be seen that the draft frame 12 is pivoted to the lister frame 6 at the down-turned ends of the beams 7 and 8 in the same manner as described above. However, the upwardly extending members 155, instead of carrying a pivot bolt 161, as in Figure 2, pivotally receives a sleeve 170 by means of trunnions 171. A connecting rod structure 154a, quite similar to the connecting rod structure 154 described above, is provided at its forward end with a threaded portion 172 and the front end of the connecting rod 154a is slidable in the sleeve 170. A spring 175 encircles the forward end of the rod 154a in front of the sleeve 170 and an adjusting nut member 179 having a crank 180 is screwed onto the threaded end 172 of the connecting rod 154a. Rearwardly of the sleeve 170 is a second and somewhat stronger spring 182, the front end of which bears against the sleeve 170 and the rear end of which bears against a collar 183 which is adapted to be fixed to the rod 154a in any suitable manner, such as a set screw 184 by which the position of the collar 183 may be adjusted. At its rear end, the rod 154a is connected by the bolt 163 to the upper end of the arm 145, in the same manner as described above in connection with the connecting rod 154.

The lower end of the arm 145 is fixed to the rock shaft 142 in substantially the same manner as described above, and likewise the rock shaft 142 is supported in the ends of the bracing members 140 and 141 as shown in Figure 1. A pair of arms 143 extend rearwardly in laterally spaced relation from the rock shaft 142, and each is formed to receive a sleeve 190 having trunnions 191 by which the sleeve is pivoted to the rear end of the associated lifting arm 143. A rod 192, having its upper end threaded, is slidably disposed in each sleeve 190 and extends downwardly and is pivoted, as at 194, to the outer end of the transverse bar 150 at substantially the same point where the chain 147 is fastened. As in the form of the invention shown in Figures 1, 2 and 3, there are two rods 192, spaced apart laterally as are the chains 147. A spring 195 bears at its upper end against the sleeve 190 and at its lower end against an adjusting collar 196, there being a spring 195 encircling each of the pressure rods 192. The lower end of each pressure rod 192 is held in place in the transverse bar 150 in any suitable manner.

By virtue of the pressure springs 182 and 195, and the associated adjustable collars 183 and 196, any degree of pressure desired may be applied against the dam forming device for holding the blades down to their work, the springs reacting against the swingable draft frame 12. As described above, the depth adjusting lever 74 may be swung to raise or lower the lister bottoms 26 to adjust the depth of operation thereof, and since this movement of the hand lever 74 results in generally vertical movement of the main frame 6 relative to the draft frame 12, it will be seen that movement of the depth adjusting lever results in varying the pressure which the springs 182 and 195 exert, since they react against the draft frame 12, as just stated. When the parts are arranged as shown in Figure 4, movement of the depth adjusting lever 74 to the position of deeper plowing, results in applying slightly increased pressure against the damming blades, and since the furrows are deeper, this additional pressure ensures that the blades will be held to the proper position. Thus, in its generic aspect, the connections shown in Figure 4 are so arranged that movement of the depth adjusting lever 74 also occasions certain adjustments for the damming device at the rear of the lister. The construction of Figure 4 has the advantage, as compared with the construction shown in Figures 1 and 2, that the control of the damming units is more positive, yet by virtue of the cushioning action of the springs, the damming units may accommodate irregularities in the ground surface.

While I have shown and described above the preferred means in which the principles of the present invention have been incorporated, it is to be understood that my invention is not to be limited to the particular means shown and described above, but that, in fact, widely different means may be employed in the broader aspects of my invention, as defined in the appended claims.

What I claim, therefore, and desire to secure by Letters Patent is:

1. A damming attachment for a soil tilling implement having a wheel supported frame carrying a furrow opener and a pivoted hitch member, said attachment including means serving as a frame connected with the implement frame, a scraper blade assembly rotatably mounted on said attachment frame means and including a plurality of scraper blades, mechanism including a member pivotally mounted on said attachment frame means for releasably holding one of said scraper blades at a time in operative position, and means connected with the hitch member and with said attachment frame for applying yielding pressure to said scraper blade assemblies to hold them down in ground engaging position.

2. A damming attachment for a soil tilling implement having a frame carrying a pair of laterally spaced furrow openers, means for raising and lowering said frame, planting means for depositing seed in the furrows formed by said furrow openers, and press wheels in rear of said planting means, said attachment including means serving as a frame connected with the implement frame, a pair of scraper blade assemblies movably connected with said implement frame rearwardly of said press wheel means and each including a plurality of scraper blades, means pivotally mounted on said implement frame for swinging movement relative thereto, and resilient connections between said last mentioned means and said scraper blade assemblies for yieldingly holding the latter in operative ground engaging position.

3. In a tillage implement, a furrow opener, means in rear thereof for depositing seed in the furrow formed by said furrow opener, press wheel means in the rear of said seed depositing means for pressing soil about said feed, a dam forming device rearwardly of said press wheel means and adapted to be operated to form dams in the furrow, means for operating said dam forming device, and means for resiliently holding said dam forming device in operating position.

4. In a tillage implement, the combination of a lister having a lister frame, a pair of lister bottoms connected therewith in laterally spaced relation, and a pair of planting units for depositing seed in the furrows opened by said lister bottoms, a damming attachment including means serving as an attachment frame, and a pair of rotatable damming blade assemblies movably connected with said attachment frame means and disposed behind said planting units, each assembly including blades shaped to engage soil in said furrows and to clear the speed deposited therein, and means for applying pressure to said blade assemblies for holding them in their operating position.

5. An implement comprising a main frame, ground engaging tool means fixedly connected with said main frame, a draft member connected together for relative swinging movement, a second ground engaging tool means connected with said main frame for movement relative thereto in a generally vertical direction, said fixedly mounted tool means offering greater resistance to movement through the soil than said movable tool means, and means controlled by the position of said draft member relative to said main frame and reacting against the latter and operative, at least in part, by virtue of the greater resistance of said first tool means for applying yielding pressure against said second tool means.

6. An implement comprising a main frame and a draft member connected together for relative swinging movement, a tool holding structure connected with said main frame for movement relative thereto in a generally vertical direction, means controlled by the position of said draft member relative to said main frame for applying yielding pressure against said tool holding structure, and means for swinging the draft member relative to said main frame for varying the pressure applied to said tool holding structure.

7. In a tillage implement, the combination of a lister having a lister frame, a pair of lister bottoms connected therewith in laterally spaced relation, and a pair of planting units for depositing seed in the furrows opened by said lister bottoms, a damming attachment including means serving as an attachment frame, and a pair of rotatable damming blade assemblies movably connected with said attachment frame means and disposed behind said planting units, each assembly including blades shaped to engage soil in said furrows and to clear the seed deposited therein, and means acting against said attachment frame between the blade assemblies for applying pressure to said attachment frame for holding said blade assemblies in their operating position.

8. In a tillage implement, the combination of a lister having a lister frame, a pair of lister bottoms connected therewith in laterally spaced relation, a hitch frame swingably connected with said lister frame, and a pair of planting units for depositing seed in the furrows opened by said lister bottoms, a damming attachment including means serving as an attachment frame, and a pair of rotatable damming blade assemblies movably connected with said attachment frame means and disposed behind said planting units, each assembly including blades shaped to engage soil in said furrows and to clear the seed deposited therein, and means responsive to movement of said hitch frame relative to said lister frame for applying pressure to said blade assemblies for holding them in their operating position.

9. In an agricultural machine, two relatively movable ground working tool means, means for applying draft to one of said tool means, and means reacting against said draft applying means for holding the other tool means in operative position.

10. In an agricultural implement, a frame, a lister bottom carried thereby, a hitch frame pivotally connected therewith, a ground engaging tool movably connected with said frame, and means connected with said hitch frame for holding said tool in operative position.

11. In an agricultural implement, a frame, a lister bottom carried thereby, a hitch frame pivotally connected therewith for transmitting draft thereto, a ground engaging tool movably connected with said frame and offering less ground resistance than said lister bottom, and means reacting against said hitch frame for holding said tool in operative position.

12. In an agricultural implement, means serving as a frame, a damming unit movably connected therewith, and means acting between said frame means and said unit for holding the latter down in ground engaging position.

13. In a tillage implement, a pair of laterally spaced furrow openers, means in rear thereof for depositing seed in the furrows formed by said furrow openers, press wheel means in the rear of said seed depositing means for pressing soil about said seed, a dam forming device rearwardly of each of said press wheel means for forming dams in the furrows, means for operating said dam forming devices, means for resiliently holding said dam forming devices in operating position, and means including a pair of laterally spaced arms pivotally mounted on the rear of the implement for raising said dam forming devices to inoperative position.

14. In a tillage implement, the combination of a lister having a lister frame and a pair of lister bottoms connected therewith in laterally spaced relation, a damming attachment including means serving as an attachment frame, and a pair of rotatable damming blade assemblies movably connected with said attachment frame means, each assembly including blades shaped to engage soil in said furrows, and means acting against said attachment frame for applying pressure to said attachment frame for holding said blade assemblies in their operating position.

WALTER H. SILVER.